June 2, 1936.　　　　M. MASNOU　　　　2,042,542
ELECTRIC CURRENT RECTIFIER
Filed April 12, 1934

Inventor:
Maurice Masnou,
by Harry E. Dunham
His Attorney.

Patented June 2, 1936

2,042,542

UNITED STATES PATENT OFFICE 2,042,542

ELECTRIC CURRENT RECTIFIER

Maurice Masnou, Paris, France, assignor to General Electric Company, a corporation of New York Application April 12, 1934, Serial No. 720,307
In France May 6, 1933

4 Claims. (Cl. 175—366)

My invention relates to electric current rectifiers which are commonly known as dry rectifiers and the operation of which is based on the asymmetrical conductivity of certain couples comprising, for example, metals and their oxides. The invention is applicable particularly, but not exclusively, to the manufacture of rectifiers of the type intended for the rectification of relatively high voltages and its principal object is the provision of improved means for and methods of forming, insulating, assembling and supporting the active plates and cooling fins of rectifiers of the dry type.

Considerable difficulties have been encountered in the manufacture of dry rectifier units wherein it has been necessary to arrange in series a large number of couples in accordance with the conventional method of assembling such couples. This method has consisted in employing circular discs provided with a central aperture and stacked on an insulating tube surrounding a central clamping bolt or rod. The manufacture of such perforated discs which permit only a very slight amount of "inverse" current to flow requires special precautions. Moreover, special measures must be taken to avoid breakdown of the insulation between the discs and the central clamping rod.

In accordance with the present invention these difficulties are avoided by so constructing the dry rectifier units that they each comprise a stack of circular non-perforated discs arranged within an insulating tube of special form and cross-section, permitting an effective cooling of the rectifying couples by means of outside cooling fins having a considerable area.

My invention will be better understood from the following description when considered in connection with the accompanying drawing and its scope will be pointed out in the appended claims.

Figure 1:
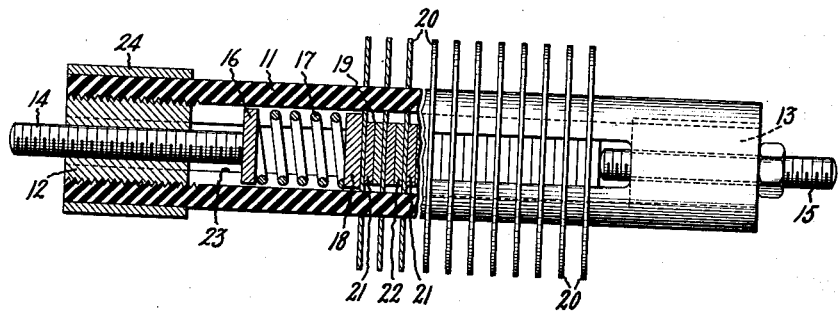
Figure 2:
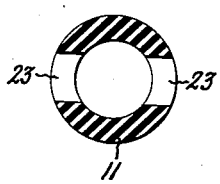
Figure 3:
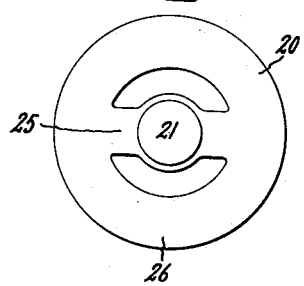
Figure 4:
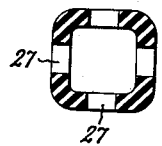
Figure 5:
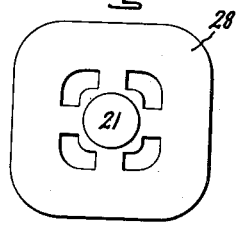

Referring to the drawing, Fig. 1 is a side elevational view partially in section illustrating a dry rectifier unit embodying my invention, and showing a part of the rectifier unit assembled in accordance with my invention; Fig. 2 is a cross-sectional view of the insulating tubular member which supports the entire rectifying system shown in Fig. 1; Fig. 3 is a plan view illustrating the shape of a cooling fin incorporated in the rectifier unit, and further showing a rectifier active plate or rectifying element in contact with the cooling fin; Fig. 4 is a cross-sectional view illustrating a modification of the supporting and insulating tubular member shown in Fig. 2; and Fig. 5 is a plan view illustrating a modification of the cooling fin shown in Fig. 3.

In Fig. 1 the rectifier unit comprises an insulating tubular member 11 the extremities of which are closed by plugs 12 and 13 which may be of metal or of insulating material and which are securely mounted in the tube 11, for example by means of screw threads, pins, or in any other suitable manner. Through plugs 12 and 13 respectively pass screws 14 and 15, which serve to compress the rectifier couples assembled within tube 11 and which constitute at the same time the outside terminals of the rectifier unit.

Considering the left-hand end of the rectifier unit shown in Fig. 1, it will be seen that the screw 14 exerts pressure on a metal disc 16, on a spring 17, on another disc 18, and finally on the rectifying stack 19 in which the rectifying action actually occurs. The rectifying stack 19 is constituted by the cooling fins or plates 20, by the rectifying discs or active plates 21 which in the present embodiment of the invention consist of red copper one face of which is oxidized, and by discs 22 of plastic metal, for example lead, these current conductive elements 20, 21 and 22 being arranged in a predetermined order.

In order to facilitate the cooling of the rectifier unit, one or more longitudinal slots 23 may be provided in the insulating tubular member 11. Fig. 2 illustrates the cross-section of such a tubular member, the tubular member 11 in this instance, having two slots which preferably begin at the left end of the tube but do not quite reach the right hand end, as shown in Fig. 1. The left or open end of the tube 11 may be enclosed by a suitable means such as a binding sleeve 24.

By shaping the cooling fins or plates 20 as shown in cross-section in Fig. 3 they may be pushed into the insulating tubular member 11, the fins 20 alternating with the pairs of discs 21, 22. The radial strip portions or arms 25 of the fins 20 extend outwardly from the center portions which make good contact with the circular rectifying discs 21, as shown in the plan view of Fig. 3, and the radial arms radiate the heat from discs 21 effectively toward the outer portions 26 of the cooling fins.

Instead of insulating tubular members 11 of circular cross-section, tubular members of other shapes may be employed, for example members of the cross-section shown in Fig. 4 which have a larger number of slots, as four slots, 27. The corresponding cooling fins 28 then will have the shape represented in Fig. 5.

When a suitable material is selected for the insulating and supporting tubular member 11, a perfect insulating and supporting means is obtained by the construction shown and described hereinabove and one which provides absolute safety from the view points of breakdown and leakage paths. This makes it possible to assemble in one tubular element as above described a large number of rectifier couples and to rectify with absolute safety and under very good cooling conditions potentials of several thousand volts. Such tubular elements may be associated in parallel or in series to meet requirements imposed by the electrical characteristics of the input and output circuits.

By taking suitable precautions, the above described tubular elements may be arranged within a tank filled with an insulating liquid such as oil. In the latter case the most perfect protection of the rectifier installation against an accidental ground is obtained.

Rectifiers in accordance with the present invention may be applied to all electric installations whose insulation must be particularly reliable, for example to X-ray tube installations wherein X-ray tubes of the Coolidge type are supplied with direct current at a very high voltage. A suitable assembly of tubular elements in accordance with the present invention makes possible the supplying of such a current by means of a rectifier which comprises no mobile part and is therefore not subject to wear, which has a practically unlimited life and which operates without noise.

What I claim as new and desired to secure by Letters Patent of the United States, is:

1. A current rectifier comprising a hollow tubular member, a stack of rectifier elements comprising a plurality of rectifying plates, means to maintain said stack under pressure within said tubular member, and means to cool said rectifying plates comprising a plurality of cooling fins having central portions within said stack, portions external to said tubular member and of sufficiently large area to dissipate the heat from said rectifying plates, and heat conducting means projecting through the walls of said tubular member to connect said central and said external portions and of sufficient area and thickness to conduct to said external portions all of the heat to be transmitted to said external portions from said rectifying plates.

2. A current rectifier comprising a hollow tubular member, a stack of current conductive elements, means to maintain said conductive elements in electrical contact within said tubular member, said stack comprising a plurality of rectifying plates and a plurality of fins for cool-rectifying said rectifying plates, said fins comprising central plate portions within said tubular member, plate portions external to said member of sufficient area to dissipate the heat from said rectifying plates, and plate portions extending radially through apertures in said tubular member to connect said central portions and said external portions, said radially extending portions being of sufficient area and thickness to conduct the heat from said rectifying plates to said external portions.

3. A current rectifier comprising an insulating and supporting member having a recess therein, a stack of rectifier elements including a plurality of rectifying plates and a plurality of cooling fins, and means to maintain the adjacent elements of said stack in contact within said member, each of said cooling fins comprising a central portion within said recess, a portion external to said insulating and supporting member and a plurality of portions extending radially of said member through the wall thereof and connecting the central portion and the external portion, said external portions providing sufficient area to dissipate the heat from said rectifying plates and said radially extending portions being of sufficient area and thickness to conduct the heat from said rectifying plates to said external portions.

4. A current rectifier comprising a hollow tubular member having a plurality of longitudinal slots, a stack of rectifier elements, means to maintain said stack under pressure within said member, said stack of rectifier elements including a plurality of rectifying discs and a plurality of cooling fins in contact with said discs to conduct heat therefrom, each of said cooling fins having a plurality of radial arm portions each extending outwardly of said member through a different one of said slots and a portion of relatively large area disposed outside of said member.

MAURICE MASNOU.